United States Patent
Gustafsson

(10) Patent No.: US 12,392,310 B2
(45) Date of Patent: Aug. 19, 2025

(54) IGNITION COIL ASSEMBLY FOR COMBUSTION ENGINE

(71) Applicant: SEM AB, Åmål (SE)

(72) Inventor: Bert Gustafsson, Åmål (SE)

(73) Assignee: SEM AB, Åmål (SE)

( * ) Notice: Subject to any disclaimer, the term of this patent is extended or adjusted under 35 U.S.C. 154(b) by 0 days.

(21) Appl. No.: 18/549,528

(22) PCT Filed: Mar. 4, 2022

(86) PCT No.: PCT/EP2022/055651
§ 371 (c)(1),
(2) Date: Sep. 7, 2023

(87) PCT Pub. No.: WO2022/189312
PCT Pub. Date: Sep. 15, 2022

(65) Prior Publication Data
US 2024/0151202 A1      May 9, 2024

(30) Foreign Application Priority Data
Mar. 8, 2021  (SE) .................... 2150259-6

(51) Int. Cl.
*F02P 3/02*       (2006.01)
*F02P 13/00*      (2006.01)

(52) U.S. Cl.
CPC ............... *F02P 3/02* (2013.01); *F02P 13/00* (2013.01)

(58) Field of Classification Search
CPC .................................... F02P 3/02; F02P 13/00
USPC ........................................................ 123/594
See application file for complete search history.

(56) References Cited

U.S. PATENT DOCUMENTS

| | | |
|---|---|---|
| 6,005,464 A | 12/1999 | Sakamaki |
| 6,216,679 B1 | 4/2001 | Skinner |
| 10,302,061 B2 | 5/2019 | Terada |
| 2018/0258901 A1* | 9/2018 | Terada .................. F02P 3/04 |

FOREIGN PATENT DOCUMENTS

| | | |
|---|---|---|
| DE | 19831196 C2 | 1/2000 |
| GB | 2361264 A | 10/2001 |
| JP | S63120863 A | 5/1988 |
| JP | H 0823344 B2 | 3/1996 |

OTHER PUBLICATIONS

International Search Report and Written Opinion, dated Jun. 3, 2022, for PCT Application No. PCT/EP2022/055651.
International Preliminary Report on Patentability, dated Sep. 12, 2023, for PCT Application No. PCT/EP2022/055651.
Communication pursuant to Article 94(3) EPC, dated Jan. 8, 2025, for Application No. 22711012.09.

* cited by examiner

*Primary Examiner* — Lindsay M Low
*Assistant Examiner* — Omar Morales
(74) *Attorney, Agent, or Firm* — Joseph T. Leone; DeWitt LLP

(57) ABSTRACT

An ignition coil assembly for installation in a spark plug well of a combustion engine and for enabling a spark of a spark plug installed in a distal end of the spark plug well. The ignition coil assembly includes an ignition coil dimensioned and configured to transform a first voltage to a second voltage for enabling the spark, and an elongated connection portion extending in the spark plug well when the ignition coil assembly is installed in the spark plug well.

12 Claims, 3 Drawing Sheets

IGNITION COIL ASSEMBLY FOR COMBUSTION ENGINE

TECHNICAL FIELD

Embodiments herein relate to ignition coils for spark ignited internal combustion engines (SI-ICE), fueled by various fuels, e.g., natural gas, hydrogen, gasoline, alcohols and the like. In particular, the embodiment herein relates to an ignition coil assembly comprising an elongated connection portion of the ignition coil construction, for transfer of primary side voltage to an ignition coil, is disclosed.

BACKGROUND

An ignition coil transforms a battery's voltage to thousands of volts needed to create a spark over the electrodes in a spark plug, to ignite a fuel mixture injected into a cylinder of a combustion engine. The ignition coil typically includes a transformer, having a primary and secondary coil winding around a soft magnetic core. In a "coil on top" construction a "coil extension" is connecting the transformer to the spark plug. In a "coil on side" construction a cable is connecting the transformer to the spark plug. To the primary side of the transformer, a low voltage is applied when a spark is to be released. The low voltage is then transformed to a high voltage on the secondary side of the transformer. The hereby created high voltage is lead through the extension/cable to the spark plug, where a spark is released over the spark plug electrode gap. The length of such an extension/cable varies, depending on the design of the engine, and is determined by the distance from the engine top cover and the location of the spark plug. In passenger car applications, the distance may be short. In heavy duty application, the distance may be long. The extension is typically surrounded by a "spark plug well" which is a part of the engine top cover and may have a zero-electric potential, i.e., it is electrically grounded. Since the engines are designed to be compact and the engine top contains a number of components essential for the functionality, such as inlet and outlet valves, rocker arms, push rods or the like, the space for the spark plug well is very limited and therefore the well is typically designed to be very narrow. However, a narrow and long spark plug well implies serious challenges, specifically for new innovative solution for SI-ICE fueled by alternative or renewable fuels such as natural and biogas, hydrogen, alcohols and the like, as explained in the following.

The elongated ignition coil extension/cable gives rise to a "stray capacitance" i.e., a capacitance that is a result of the interaction between the extension/cable and the spark plug well. The magnitude of this stray capacitance increases with the length of the extension/cable and the reciprocal of the distance between the extension/cable and the spark plug well. Clearly, when the spark plug well is deep and narrow, then the stray capacitance is large.

Now, consider the release of a spark. A high voltage pulse is released from the secondary side of the transformer. The high voltage pulse charges the stray capacitance in parallel with increasing the voltage over the spark plug gap. Finally, when the voltage is high enough to generate a flash-over (break down) over the spark plug electrode gap, a current is generated across the gap—i.e. the spark. The current and energy during the flash-over and shortly thereafter may be very high, and it increases with increased stray capacitance because the charge that has been built up in the stray capacitance is then almost instantaneously released, which generates a high current peak. Such high current peaks may not be beneficial for the ignitability and may significantly reduce the life-time of the spark plug that leads to a painful increase in the total cost of ownership for the end user. This is especially true in the case of commercial heavy-duty engines, in which case the spark plugs are expensive, and minimizing down-time due to service is important to maintain profitable. Also, such high current peaks create electromagnetic radiation and may make it difficult to meet the requirements on electromagnetic radiation (EMC).

The aforementioned desire to minimize the stray capacitance due to long high voltage extensions/cables becomes increasingly important when optimizing the performance of SI-ICE fueled by fuels that allow high compression in combination with a low required spark energy to initiate a sustainable combustion, i.e., a robust ignition. Hydrogen is an example of such a fuel and is an energy carrier that has recently come in focus for use in SI-ICE motivated by its zero emission of greenhouse gases. Numerous initiatives are taken to develop and optimize the performance of such engines. However, the ignition system may be a limiting component for the reachable engine performance, unless designed to generate a spark of high available spark voltage, while keeping the spark energy high enough to initiate a robust combustion, but not higher than that to avoid the aforementioned excess spark plug wear. Also, it is expected that a high available voltage but low energy spark will reduce the risk for pre-ignition, which is a well-known challenge in hydrogen fueled SI-ICE applications. Pre-ignition is an undesired combustion before it was intended to start by the release of a spark. Pre-ignitions are due to hot spots in the combustion chamber that start the undesired combustion during the compression stroke. Such pre-ignitions lead to a rapid in-cylinder pressure rise that may have catastrophic consequences and must be avoided. Clearly, the spark plug electrodes become hot during operation and may become a primary source to the aforementioned hot spots. By reducing the spark energy, the temperature of the spark plug electrodes may be decreased, and the risk for hot spot generation avoided.

SUMMARY

An object may be to eliminate, or at least reduce, one or more the abovementioned disadvantages and/or problems.

At least some embodiments of the invention resolves the aforementioned challenges with long high voltage extensions/cables in deep spark plug wells and enables engine design for improved efficiency and performance which is increasingly important when designing high performance heavy duty SI-ICE fueled by alternative and renewable fuels that meet the requirements for reduced greenhouse gas emission and are an important complement to electrification in the global effort to limit the climate change that threats our planet.

According to an aspect, the object is achieved by an ignition coil assembly for installation in a spark plug well of a combustion engine and for enabling a spark of a spark plug installed in a distal end of the spark plug well. The ignition coil assembly comprises an ignition coil adapted to transform a first voltage to a second voltage for enabling the spark.

The ignition coil assembly further comprises an elongated connection portion extending in the spark plug well when the ignition coil assembly is installed in the spark plug well.

The ignition coil is connected to a first end of the elongated connection portion. The first end of the elongated connection portion is closer to the spark plug than a second end of the elongated connection portion when the ignition coil assembly is installed in the spark plug well, whereby the ignition coil assembly is adapted to provide the first voltage to the ignition coil by means of the elongated connection portion.

The ignition coil is connected to the first end of the elongated connection portion, and preferably located in the distal portion of the spark plug well when the ignition coil assembly is installed in the spark plug well. In this manner, the second voltage may be transferred to the spark plug while reducing stray capacitances as compared to e.g., known ignition coils with extensions that transfer a very high voltage for generating a spark.

A further advantage is that space, occupied by the ignition coil assembly when installed in a combusting engine, outside the spark plug well is reduced, thanks to that the ignition coil is positioned within the spark plug well when installed.

In some embodiments, the elongated connection portion is adapted to position the ignition coil completely within a distal portion of the spark plug well when the ignition coil assembly is installed in the spark plug well. For example, a length of the elongated connection portion is at least half of the depth of the spark plug well, thereby positioning the ignition coil completely within the distal portion. The distal portion may typically comprise the distal end. In this manner, it may be ensured that capacitive load for transfer of the second voltage to the spark plug is reduced, e.g. compared to when the ignition coil is positioned further away from the distal end, i.e. closer to the orifice of the spark plug well.

In some embodiments, the elongated connection portion extends along at least half of the spark plug well's longitudinal length when the ignition coil assembly is installed in the spark plug well. Similar to the previous embodiment, it is desired to reduce distance between the ignition coil and a spark plug connector for connection to the spark plug.

In some embodiments, the elongated connection portion comprises a rigid tubular extension member extending at least within the spark plug well when the ignition coil assembly is installed in the spark plug well. As a result, the rigid tubular extension member may mechanically secure the position of the ignition coil such that a robust and reliable electrical connection to the spark plug is achieved when the ignition coil assembly is installed in the spark plug well.

In some embodiments, the ignition coil assembly comprises a controller connection portion for connecting the ignition coil assembly to an ignition controller for controlling timing and/or amount of the voltage for enabling the spark. In this manner, the connection portion may easily be replaced for adaption of the ignition coil assembly to different controller interfaces.

In some embodiments, the elongated connection portion comprises a heat transferring member for cooling of the ignition coil. Increased cooling capacity of the ignition coil assembly may reduce wear of the spark plug. Thereby, reducing cost for maintenance and/or cost of spark plug for replacement of a worn-out spark plug.

In some embodiments, the elongated connection portion comprises a ventilation arrangement for evacuating any residual gases from the spark plug well.

In some embodiments, the ignition coil assembly comprises a fastening element for fastening the ignition coil assembly at the combustion engine. In this manner, it may be ensured that the elongated connection portion reliably abuts the ignition coil, which in turn reliably abuts the spark plug when the ignition coil assembly is installed in the spark plug well. As a result, reliable electrical connection to the spark plug is achieved.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
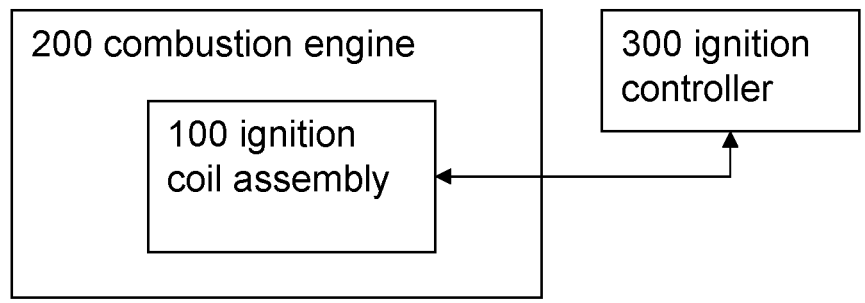
FIG. 1 is a schematic overview illustrating an exemplifying system in which embodiments of the ignition coil assembly herein may be implemented.

Throughout the following description, similar reference numerals have been used to denote similar features, such as nodes, actions, modules, circuits, parts, items, elements, units or the like, when applicable. In the Figures, features that appear in some embodiments are typically indicated by dashed lines.

FIG. 1 depicts an exemplifying ignition coil assembly 100 according to embodiments herein. The ignition coil assembly 100 is illustrated as installed in a combustion engine 200, such as an internal combustion engine, a gasoline or hydrogen combustion engine or the like. The combustion engine may be mounted in a stationary manufacturing device, a vehicle, such as a boat, a car, a lorry, etc.

An ignition controller 300, such as a processing unit, a microprocessor, an ignition box, an ignition control module, an ignition driver or the like, is provided for control of timing and/or amount of the voltage for enabling the spark. The ignition controller 300 has a controller interface, which may be different for different manufactures of the ignition controller 300. The controller interface may be a connector, a socket, a plug or the like, with a suitable number of conductors for power and/or control signalling.

Figure 2:
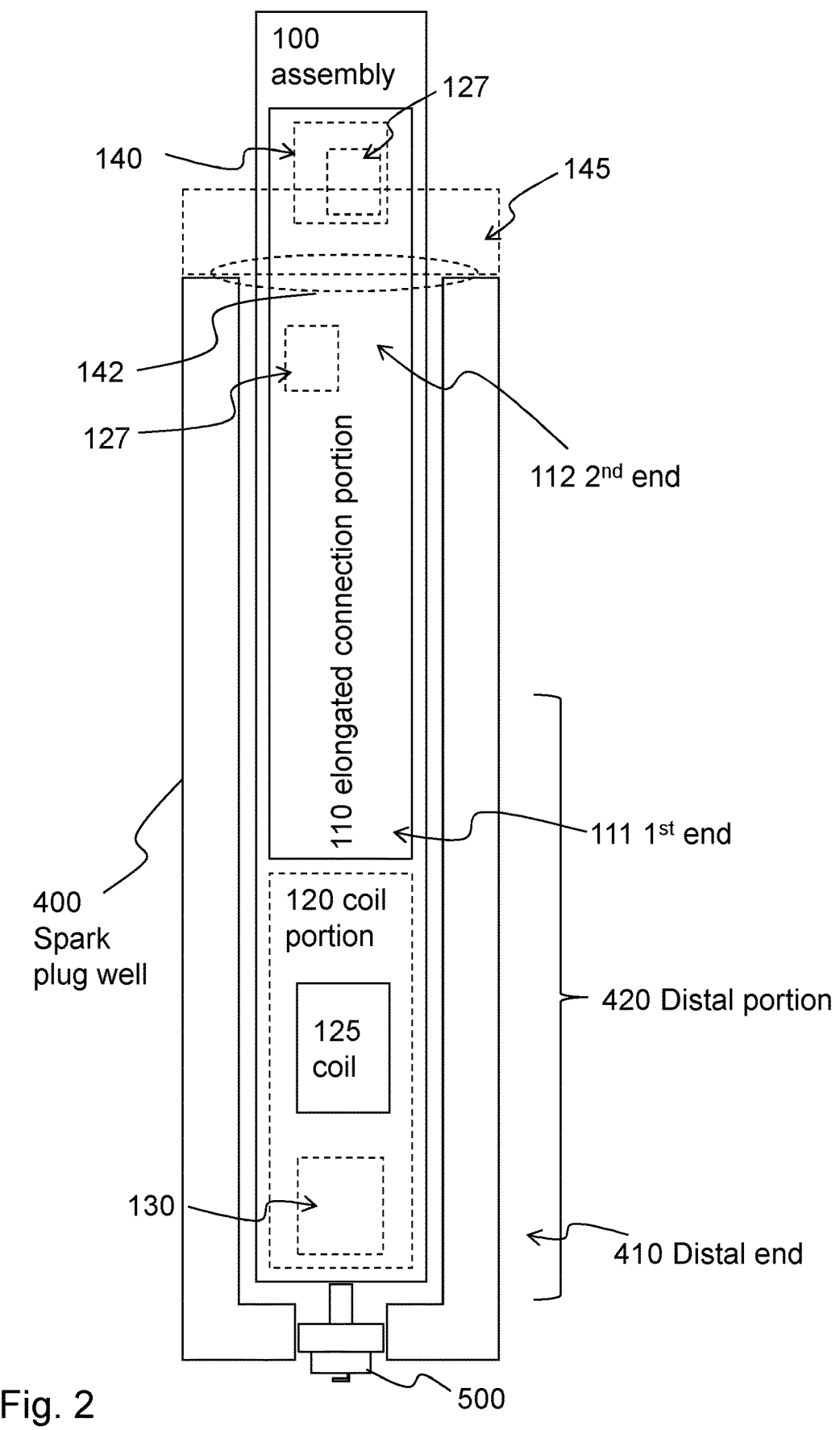
FIG. 2 is a schematic side view illustrating an exemplifying ignition coil assembly.

Turning to FIG. 2, an exemplifying ignition coil assembly 100 for installation in a spark plug well 400 of a combustion engine 200 and for enabling a spark of a spark plug 500 installed in a distal end 410 of the spark plug well 400 is shown. An ignition system (not shown) may include the ignition controller 300 and the ignition coil assembly 100.

As an example, the diameter of the spark plug well 400 may be between 1-6 cm, preferably 1-5 cm, most preferably 2-4 cm.

The ignition coil assembly 100 comprises an ignition coil 125 adapted to transform a first voltage to a second voltage for enabling the spark. As used herein, "first" and "second" in the terms "first voltage" and "second voltage" is merely used to distinguish two different voltage levels from each other. There may be several other voltage levels in an ignition system. It may be that the ignition coil assembly 100 comprises a coil portion 120, which may comprise the ignition coil 125.

The first voltage is less than the second voltage. The first voltage may be in the range of 100-600 volts, more preferably 200-500 volts, most preferably 300-400 volts. The second voltage may be in the range of 1-60 kilovolts, more preferably 5-50 kilovolts, most preferably 35-45 kilovolts.

The first voltage may typically be transformed from a supply voltage of e.g. 4.5-36 volts, preferably 12-24 volts.

The ignition coil assembly 100 further comprises an elongated connection portion 110 extending in the spark plug well 400 when the ignition coil assembly 100 is installed in the spark plug well 400. The elongated connection portion 110 may extend both within and outside the spark plug well 400 when installed in the spark plug well 400. The elongated connection portion 110 typically has a length of 5-60 cm, preferably 15-45 cm, most preferably 16-40 cm.

The elongated connection portion 110 typically comprises at least two conductors for electrically connecting, e.g. the first voltage when generating a spark, to the ignition coil 125, i.e. the primary side thereof. As a comparison, it may be noted that prior art extensions connecting to the spark plug are provided with only one conductor, since the spark plug is grounded via the cylinder.

Moreover, voltage requirements on the elongated connection portion 110 is typically several times less than on conventional extensions. The elongated connection portion 110 therefore needs less insulation than such conventional extensions, which contributes to a reduction of cost due to insulation material. As an example, the voltage requirement of the elongated connection portion 110 may be one tenth of that for a conventional extension.

The ignition coil 125 is connected, such as mechanically and electrically connected, to a first end 111 of the elongated connection portion 110. The first end 111 of the elongated connection portion 110 is closer to the spark plug 500 than a second end 112 of the elongated connection portion 110 when the ignition coil assembly 100 is installed in the spark plug well 400, whereby the ignition coil assembly 100 is adapted to provide the first voltage to the ignition coil 125 by means of the elongated connection portion 110. As explained above, the ignition coil assembly 100 may be adapted to provide the first voltage to the ignition coil 125 by that the elongated connection portion 110 comprises two conductors for applying the first voltage over the ignition coil 125, i.e. over the primary winding, aka primary side, of the ignition coil 125.

Thanks to the elongated connection portion 110, a distance between the ignition coil 125 and the spark plug 500 is reduced compared to prior art solutions. As a result, a capacitance of an electrical connection therebetween is reduced. When the second voltage is provided to the spark plug 400, losses are in turn advantageously reduced.

A further advantage with the embodiments herein may be that the spark plug well 400 shields the ignition coil 125 as a Faraday's cage when the ignition coil assembly 100 is installed in the spark plug well 400. In this manner, electromagnetic waves from the ignition coil 125 is prevented, or at least reduced. As a result, potential disturbance caused by the ignition coil 125 may be reduced.

In some examples, the elongated connection portion 110 may be adapted to position the ignition coil 125 completely within a distal portion 420 of the spark plug well 400 when the ignition coil assembly 100 is installed in the spark plug well 400. The distal portion 420 may comprise the distal end 410.

The elongated connection portion 110 may extend over a substantial portion of the longitudinal length of the spark plug well 400 when the ignition coil assembly 100 is installed in e.g. a combustion engine.

In some examples, the elongated connection portion 110 may extend along at least half of the spark plug well 400 longitudinal length when the ignition coil assembly 100 is installed in the spark plug well 400.

The ignition coil assembly 100 may comprise a spark plug connection portion 130, such as a connection part or the like. The spark plug connection portion 130 may be adapted to interconnect, such as electrically interconnect, the ignition coil 125 and the spark plug (500).

The spark plug connection portion 130 may be adapted to provide the second voltage to the spark plug 500. The spark plug connection portion 130 may be adapted to be installed in close proximity of the distal end 410. Accordingly, the spark plug connection portion 130 may include only one conductor for application of the second voltage to the spark plug 500.

Generally, a distance along a longitudinal axis of the spark plug well 400 between the ignition coil 125 and the spark plug 500, when the ignition coil assembly 100 is installed in the spark plug well 400, may be made as short as possible. Typically, the distance is 1-7 cm, preferably 1-5 cm, and most preferably 1-3 cm.

In some examples (not shown), a so-called boot may be installed between the spark plug connection portion 130 and the spark plug 500 according to conventional manners.

The spark plug connection portion 130 may have a first electrical and mechanical interface towards the coil portion 120 and/or the ignition coil and a second electrical and mechanical interface towards the spark plug 500.

The second electrical and mechanical interface may be adapted to different spark plugs and/or spark plug wells. In this manner, the same coil portion 120 and/or the same ignition coil 125 may be used without modification for different spark plugs and/or spark plug wells when the first electrical mechanical interface remain the same.

Furthermore, according to embodiments herein, a distance between the ignition coil and the spark plug may be kept relatively short. This means that a total capacitance of the spark plug well, the spark plug connection portion 130 and the spark plug 500 is typically substantially less than in prior art solution, which require a relatively long extension for transfer of the second voltage to the spark plug, Since capacitance is reduced, capability to hold energy is reduced. In this manner, less energy is required for charging amongst other the spark plug connection portion 130. Thus, energy required for generation of a spark is reduced, since a greater portion of the applied energy is beneficially used over the spark plug gap. Also, according to the embodiments herein, it will be possible to generate sparks with a significantly lower energy than before, due to the reduced stray capacitance. This feature is increasingly important when applied to fuels that require a low energy to initiate a sustainable combustion (ignition), but where it is desirable to keep the spark energy to a minimum, or near minimum. An example of such a fuel is hydrogen, that has the attractive feature to have zero greenhouse gas emission, where pre-ignition may be a severe challenge. Any excess spark energy may lead to hot-spots, which may generate spontaneous ignition prior to the spark release. Such pre-ignitions may destroy the engine and may thus preferably be avoided.

In some examples, the elongated connection portion 110 has a first length in a longitudinal direction thereof. Moreover, the spark plug connection portion has a second length in the longitudinal direction thereof. The first length may be greater than the second length.

In some examples, the elongated connection portion 110 may comprise a rigid tubular extension member extending at least within the spark plug well 400 when the ignition coil assembly 100 is installed in the spark plug well 400. In other examples, the elongated connection portion 110 may be flexible.

It is preferred that the elongated connection portion 110 is stiff in the longitudinal direction thereof. Thereby, it may be ensured that electrical connection to the spark plug is maintained also during vibrations, sudden movement or the like, which may occur during operation of the combustion engine.

Apart from that the elongated connection portion 110 ensures the electrical connection to the spark plug 500, it mechanically maintains the position of the ignition coil 125 such as to reduce mechanical wear on abutting and/or connecting surfaces of the ignition coil 125 and/or the coil portion 120 and the spark plug connection portion 130.

In some examples, the ignition coil assembly 100 may comprise a controller connection portion 140 for connecting the ignition coil assembly 100 to an ignition controller for controlling timing and/or amount of the voltage for enabling the spark. The controller connection portion 140 may also include connectors for connecting to a primary energy supply, such as a battery often a 12 V or 24 V battery. The elongated connection portion 110 may extend from the controller connection portion 140 to the coil portion 120 and/or the ignition coil 125.

The ignition coil assembly 100 may comprise a fastening element 145 for fastening the ignition coil assembly 100 at the combustion engine. The controller connection portion 140 may comprise the fastening element 145. In some examples, the elongated connection portion 110 may comprise the fastening element 145, in addition to or as an alternative to that the controller connection portion 140 comprises the fastening element 145. The fastening element may be adapted for different manufacturers, with e.g. different fastening positions/points, types of fastening element etc.

In this manner, it may be ensured that the elongated connection portion 110 reliably abuts the coil portion 120 and/or the ignition coil 125, which in turn reliably abuts the spark plug 500 when the ignition coil assembly 100 is installed in the spark plug well 400. As a result, reliable electrical connection to the spark plug 500 is achieved.

Moreover, the ignition coil assembly 100 may comprise electronic circuitry for managing e.g. the controller interface or the like. The elongated connection portion 110 and/or the controller connection portion 140 may comprise some or all of such electronic circuitry.

In some embodiments of the ignition coil assembly 100, the elongated connection portion 110 and the coil portion 120 may be separate connectable parts. The elongated connection portion 110 may in these embodiments typically comprise the controller connection portion 140 as already exemplified above.

Furthermore, the coil portion 120 may comprise the spark plug connection portion 130.

In one example, the ignition coil assembly 100 comprises two separable and/or connectable parts, i.e. the elongated connection portion 110 and the coil portion 120. It may even, in further examples, be that the ignition coil assembly 100 only comprises the elongated connection portion 110 and the coil portion 120.

With some embodiments herein, an advantage may thus be that the coil assembly 100 may be adapted for different applications in an efficient manner. For example, different applications may require different spark plug well 500 depths, different controller interfaces or the like. For example, the coil portion 120 may be the same for many different applications, while it is enough to adapt the elongated connection portion 110 to the different applications.

In prior art solutions, it is typically required to adapt both the extension and an upper portion of the ignition coil, often referred to as housing and/or connector.

In some examples, the ignition coil assembly 100 may comprise one or more further transformers 127. Such one or more further transformers 127 may be located in any part of the ignition coil assembly 100, e.g., even in the controller connection portion 140 and/or the elongated connection portion 110. In one example embodiment, the ignition coil assembly 100 may thus comprise the ignition coil 125, and a transformer 127, which may be connected to provide the first voltage to the ignition coil 125.

With the transformer 127, a feed voltage may be transformed into the first voltage for provision to the ignition coil 125. As an example, the feed voltage may in turn have been transformed from the supply voltage. The transformer 127 may preferably be located in the vicinity of the spark plug well orifice 142. This means that the transformer 127 may be comprised in the elongated connection portion 110, preferably in the $2^{nd}$ end 112 thereof.

In some more detailed examples, the transformer 127 may be comprised in the controller connection portion 140.

In some examples, the location of the transformer 127 may be at least partly outside the spark plug well 400, e.g. outside or even completely outside the spark plug well 400. In this manner, the transformer 127 may be spatially bigger than when confined by the spark plug well 400. Thereby enabling the transformer 127 to be constructed to have a better efficiency. An advantage, e.g. over using only the ignition coil 125, may thus be that a better overall efficiency may be achieved.

In addition, thanks to that the transformer 127 performs some of the transformation from the feed voltage towards the desired second voltage, i.e. by providing the first voltage, the ignition coil 125 may be made smaller since the first voltage provided to it is greater than in a case without the transformer 127. A further advantage is hence that the ignition coil 125 may fit inside narrower and/or tighter spark plug wells. A reason for this is that the ignition coil 125 may be made smaller, in terms of spatial dimensions and/or transformer ratio, since the transformer 127 relieves some burden from the ignition coil 125 when the transformer supports the ignition coil 125 in at least a part of the transformation from the feed voltage to the second voltage, i.e. from the feed voltage to the first voltage.

With some of the examples direly above, the first voltage may be in the range of 1000-6000 volts, more preferably 2000-5000 volts, most preferably 3000-4000 volts. As an example, the second ignition coil may then have a transformer ratio of 1:10 and the first ignition coil may a transformer ratio of 1:10.

The ignition coil 125 and the transformer(s) 127 are typically connected in series, such as in a cascade coupling or the like.

Figure 3:
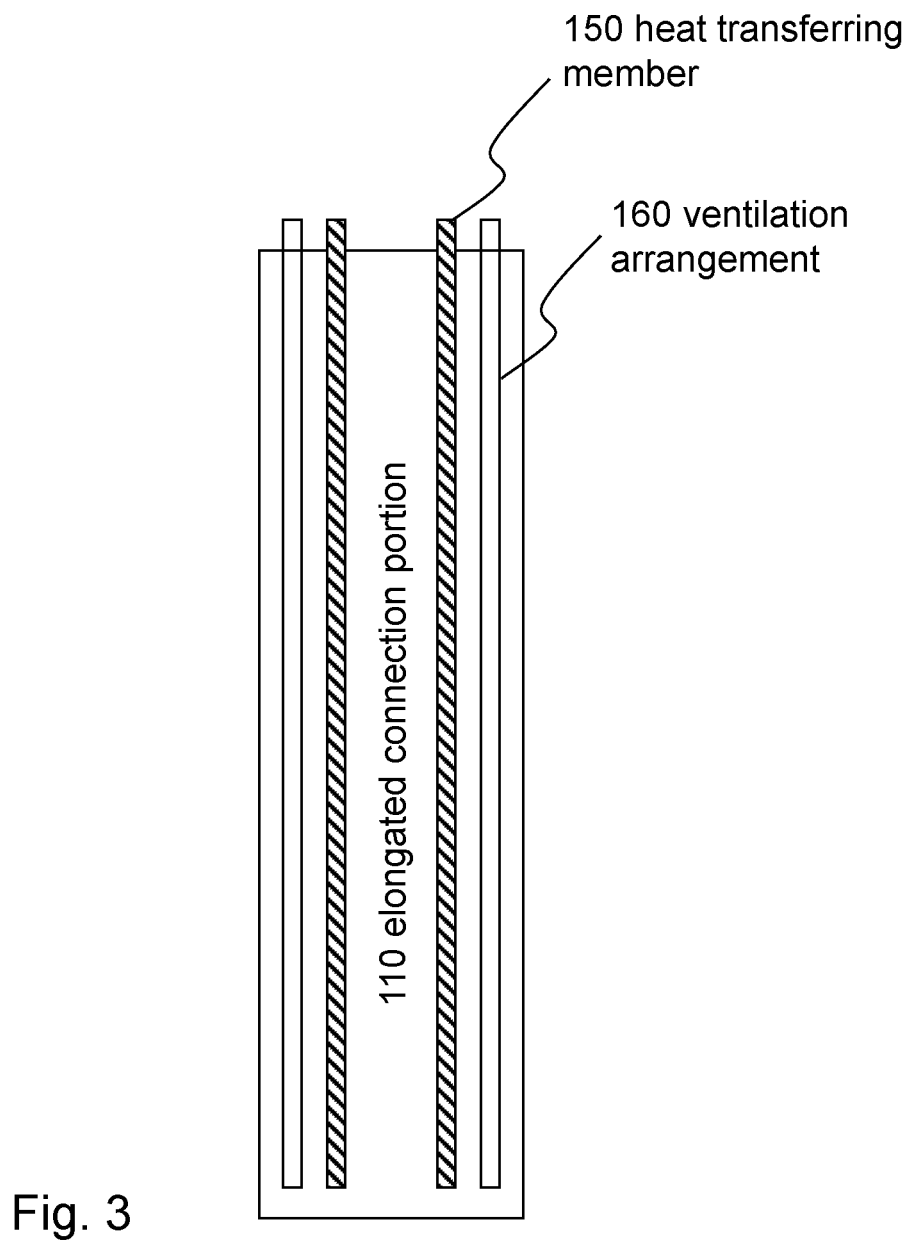
FIG. 3 is a further schematic side view illustrating particular embodiments of the ignition coil assembly disclosed herein.

As shown in FIG. 3, the elongated connection portion 110 may comprise a heat transferring member 150 for cooling of the ignition coil 125. The heat transferring member 150 may be a heat convection arrangement, a heat conducting arrangement or the like. In this manner, heat dissipation from in particular the spark plug and the ignition coil may be increased. As a result, it is expected that wear on the spark plug is reduced. The heat transferring member 150 may be adapted for connection to a cooling system (not shown).

Moreover, referring to FIG. 3, the elongated connection portion 110 may comprise a ventilation arrangement 160 for evacuating any residual gases from the spark plug well. The ventilation arrangement 160 may allow gases, such as air, residual gases, fuel mixture, exhaust gas or the like, to be evacuated from the spark plug well 400 while at the same time being waterproof against water attempting to enter the spark plug well 400 at the entrance thereof, i.e. at the opposite end compared to where the spark plug 500 may be installed. This means that the elongated connection portion 110 and/or the ventilation arrangement 160 may comprise a sealing for the spark plug well orifice 142. The ventilation arrangement 160 may be adapted for connection to a ventilation system (not shown).

Each embodiment, example or feature disclosed herein may, when physically possible, be combined with one or more other embodiments, examples, or features disclosed herein. Furthermore, many different alterations, modifications and the like of the embodiments herein may be become apparent for those skilled in the art. The described embodiments are therefore not intended to limit the scope of the present disclosure.

The invention claimed is:

1. An ignition coil assembly (100) for installation in a spark plug well (400) of a combustion engine (200) and for enabling a spark of a spark plug (500) installed in a distal end (410) of the spark plug well (400), wherein the ignition coil assembly (100) comprises:
    an ignition coil (125) adapted to transform a first voltage to a second voltage for enabling the spark, and
    an elongated connection portion (110) extending in the spark plug well (400) when the ignition coil assembly (100) is installed in the spark plug well (400), wherein the ignition coil assembly (100) is characterized by that:
    the ignition coil (125) is connected to a first end (111) of the elongated connection portion (110), wherein the first end (111) of the elongated connection portion (110) is closer to the spark plug (500) than a second end (112) of the elongated connection portion (110) when the ignition coil assembly (100) is installed in the spark plug well (400), whereby the ignition coil assembly (100) is adapted to provide the first voltage to the ignition coil (125) by means of the elongated connection portion (110),
    wherein the elongated connection portion (110) is adapted to position the ignition coil (125) completely within a distal portion (420) of the spark plug well (400) when the ignition coil assembly (100) is installed in the spark plug well (400) wherein the distal portion (420) comprises the distal end (410), and
    wherein the elongated connection portion (110) extends along at least half of the spark plug well (400) longitudinal length when the ignition coil assembly (100) is installed in the spark plug well (400).

2. The ignition coil assembly (100) according to claim 1, wherein the elongated connection portion (110) comprises a rigid tubular extension member extending at least within the spark plug well (400) when the ignition coil assembly (100) is installed in the spark plug well (400).

3. The ignition coil assembly (100) according to claim 1, wherein the ignition coil assembly (100) comprises a controller connection portion (140) for connecting the ignition coil assembly (100) to an ignition controller for controlling timing and/or amount of the voltage for enabling the spark.

4. The ignition coil assembly (100) according to claim 1, wherein the elongated connection portion (110) comprises a heat transferring member (150) for cooling of the ignition coil (125).

5. The ignition coil assembly (100) according to claim 1, wherein the elongated connection portion (110) comprises a ventilation arrangement (160) for evacuating any residual gases from the spark plug well.

6. The ignition coil assembly (100) according to claim 1, wherein the ignition coil assembly (100) comprises a fastening element (145) for fastening the ignition coil assembly (100) at the combustion engine.

7. The ignition coil assembly (100) according to claim 1, wherein the elongated connection portion (110) extends along at least half of the spark plug well (400) longitudinal length when the ignition coil assembly (100) is installed in the spark plug well (400).

8. The ignition coil assembly (100) according to claim 1, wherein the elongated connection portion (110) comprises a rigid tubular extension member extending at least within the spark plug well (400) when the ignition coil assembly (100) is installed in the spark plug well (400).

9. The ignition coil assembly (100) according to claim 1, wherein the ignition coil assembly (100) comprises a controller connection portion (140) for connecting the ignition coil assembly (100) to an ignition controller for controlling timing and/or amount of the voltage for enabling the spark.

10. The ignition coil assembly (100) according to claim 1, wherein the elongated connection portion (110) comprises a heat transferring member (150) for cooling of the ignition coil (125).

11. The ignition coil assembly (100) according to claim 1, wherein the elongated connection portion (110) comprises a ventilation arrangement (160) for evacuating any residual gases from the spark plug well.

12. The ignition coil assembly (100) according to claim 1, wherein the ignition coil assembly (100) comprises a fastening element (145) for fastening the ignition coil assembly (100) at the combustion engine.

* * * * *